US008620505B2

(12) United States Patent
Sah et al.

(10) Patent No.: US 8,620,505 B2
(45) Date of Patent: Dec. 31, 2013

(54) STAND ALONE ENGINE SPEED CONTROL AT COLD START FOR HYBRID TRANSMISSION

(75) Inventors: Jy-Jen F. Sah, West Bloomfield, MI (US); Lan Wang, Troy, MI (US); Paul A. Stanowski, Trenton, MI (US); Neal A. Chaperon, Commerce Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 122 days.

(21) Appl. No.: 13/273,305

(22) Filed: Oct. 14, 2011

(65) Prior Publication Data

US 2013/0096744 A1 Apr. 18, 2013

(51) Int. Cl.
*B60L 11/00* (2006.01)
*G06F 7/00* (2006.01)
*B60K 6/20* (2007.10)
*B60W 20/00* (2006.01)

(52) U.S. Cl.
CPC . *B60L 11/00* (2013.01); *G06F 7/00* (2013.01); *B60K 6/20* (2013.01); *B60W 20/00* (2013.01)
USPC ............. 701/22; 180/65.21; 180/65.265; 477/3

(58) Field of Classification Search
USPC ........... 701/22; 180/65.21–65.8; 903/945; 475/5; 477/3
See application file for complete search history.

(56) References Cited

U.S. PATENT DOCUMENTS

| | | | | |
|---|---|---|---|---|
| 6,367,570 | B1 * | 4/2002 | Long et al. | 180/65.26 |
| 6,551,208 | B1 | 4/2003 | Holmes et al. | |
| 6,856,034 | B2 * | 2/2005 | Peters et al. | 290/40 C |
| 7,013,213 | B2 * | 3/2006 | McGee et al. | 701/113 |
| 7,645,206 | B2 | 1/2010 | Holmes et al. | |
| 8,200,382 | B2 * | 6/2012 | Hahn | 701/22 |
| 2008/0318727 | A1 * | 12/2008 | Matsubara et al. | 477/3 |
| 2009/0076693 | A1 * | 3/2009 | Kumazaki et al. | 701/55 |
| 2010/0125019 | A1 * | 5/2010 | Tabata et al. | 477/3 |
| 2012/0031691 | A1 * | 2/2012 | Fuechtner et al. | 180/65.6 |

* cited by examiner

*Primary Examiner* — Thomas Tarcza
*Assistant Examiner* — Tyler J Lee

(57) ABSTRACT

A hybrid powertrain includes and internal combustion engine, an energy storage device, an electro-mechanical transmission having at least one electric machine rotatably coupled to the engine. The electro-mechanical transmission is selectively controllably operative to transmit torque among the engine and the at least one electric machine. A method to start operation of the internal combustion engine includes initiating rotation of a crankshaft of the engine with the at least one electric machine until a first predetermined crankshaft speed is achieved, firing the engine while controlling engine speed with the at least one electric machine until a flare threshold occurs, controlling the engine speed without any interaction from the at least one electric machine based on controlling combustion parameters of the engine, and when a predetermined condition occurs, controlling the engine speed with the at least one electric machine while the engine is still firing.

14 Claims, 3 Drawing Sheets

STAND ALONE ENGINE SPEED CONTROL AT COLD START FOR HYBRID TRANSMISSION

TECHNICAL FIELD

This disclosure is related start operation of an internal combustion engine within a hybrid powertrain.

BACKGROUND

The statements in this section merely provide background information related to the present disclosure. Accordingly, such statements are not intended to constitute an admission of prior art.

Electrically-variable transmissions typically have an input member connected to an engine and one or two motor/generators connected to different members of planetary gear sets to allow one or more electrically-variable modes of operation, fixed speed ratios, an electric-only battery power mode.

It is known to utilize the one or two motor/generators to provide torque to the engine for spinning the engine for starting the engine. It is further known to control the rotational speed of the crankshaft of the engine with the one or two motor/generators during engine firing. Batteries known for supplying power to the one or two motor/generators can have a narrow operating range and may be subject to damage from charging spikes during cold start conditions.

SUMMARY

A hybrid powertrain includes and internal combustion engine, an energy storage device, an electro-mechanical transmission having at least one electric machine rotatably coupled to the engine. The electro-mechanical transmission is selectively controllably operative to transmit torque among the engine and the at least one electric machine. A method to start operation of the internal combustion engine includes initiating rotation of a crankshaft of the engine with the at least one electric machine until a first predetermined crankshaft speed is achieved, firing the engine while controlling engine speed with the at least one electric machine until a flare threshold occurs, controlling the engine speed without any interaction from the at least one electric machine based on controlling combustion parameters of the engine, and when a predetermined condition occurs, controlling the engine speed with the at least one electric machine while the engine is still firing.

BRIEF DESCRIPTION OF THE DRAWINGS

One or more embodiments will now be described, by way of example, with reference to the accompanying drawings, in which.

DETAILED DESCRIPTION

Figure 1:
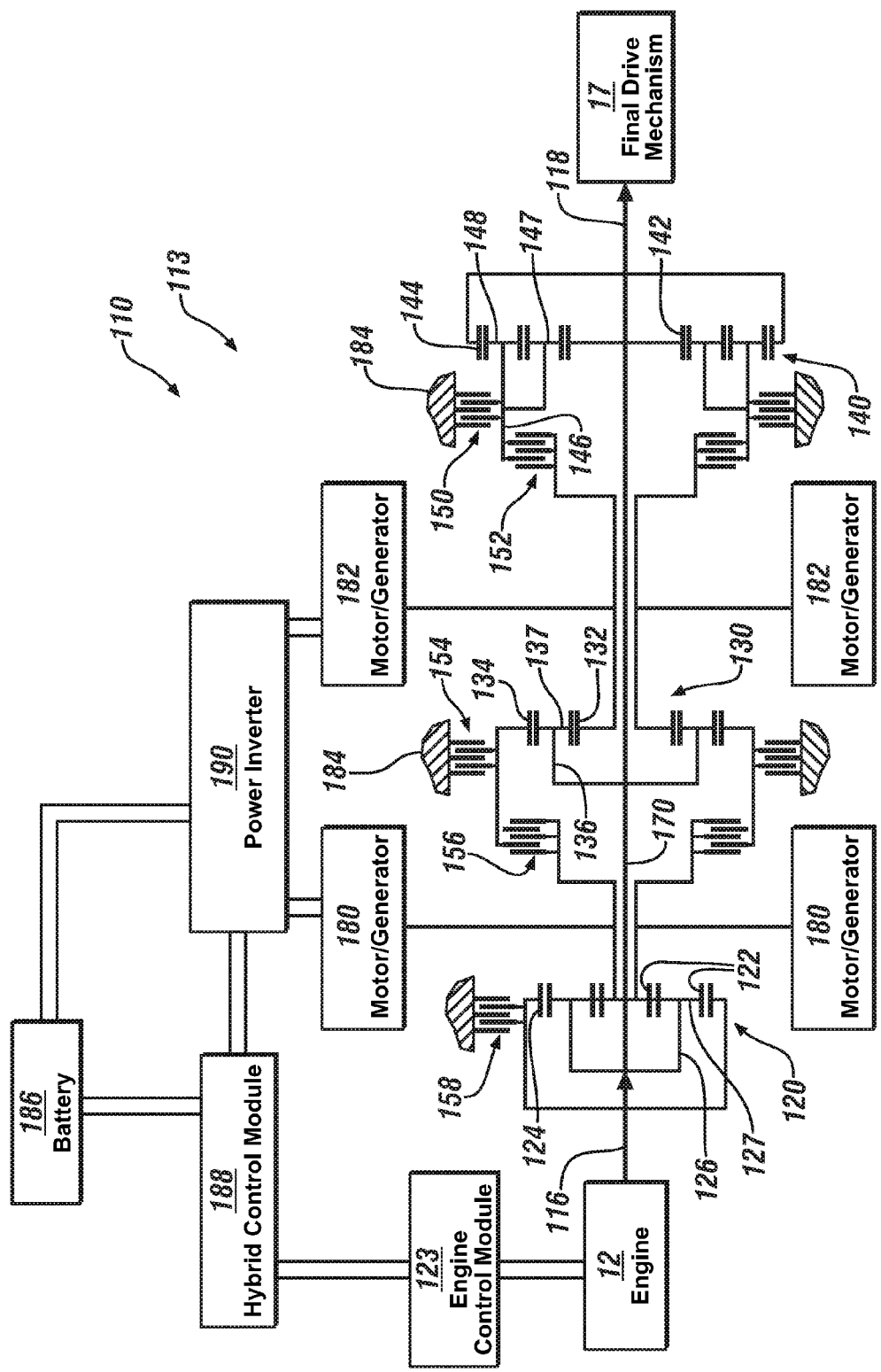
FIG. 1 illustrates an exemplary hybrid drive powertrain including an engine, transmission, energy storage device and control system, in accordance with the present disclosure.

Referring now to the drawings, wherein the showings are for the purpose of illustrating certain exemplary embodiments only and not for the purpose of limiting the same, referring to FIG. 1, a powertrain 110 is illustrated, providing a specific embodiment of a transmission 113. Powertrain 110 includes an engine 12, a final drive mechanism 17, and an electrically-variable transmission 113 with an input member 116 connected for rotation with the engine 12 and an output member 118 connected for rotation with the final drive mechanism 17. The transmission 113 includes three planetary gear sets 120, 130, and 140. The transmission 113 is designed to receive at least a portion of its driving power from the engine 12 in some of its operating modes, as discussed below. The electrically-variable transmission 113 includes two electric machines (hereinafter motor/generators) 180 and 182. As will become apparent, the motor/generators 180,182 are selectively rotatably coupled to the engine 12 where the electro-mechanical transmission 113 may be selectively controllably operative to transmit torque among the engine 12 and the motor/generators 180, 182.

The planetary gear set 120 includes a sun gear member 122 a ring gear member 124, and a carrier member 126. The carrier member 126 rotatably supports a plurality of pinion gears 127 that are disposed in meshing relationship with both the sun gear member 122 and the ring gear member 124. The planetary gear set 130 includes a sun gear member 132, a ring gear member 134, and a carrier member 136 that rotatably supports a plurality of pinion gears 137 that are disposed in meshing relationship with both the sun gear member 132 and the ring gear member 134. The planetary gear set 140 includes a sun gear member 142, a ring gear member 144, and a carrier member 146. The carrier member 146 rotatably supports a first set of pinion gears 147 as well as a second set of pinion gears 148. The first set of pinion gears 147 are disposed in meshing relationship with both the sun gear member 142 and the second set of pinion gears 148. The second set of pinion gears 148 is disposed in meshing relationship with the first set of pinion gears 147 and with the ring gear member 144. Thus, the planetary gear set 140 is a compound, sun gear member-pinion gear-pinion gear-ring gear member gear set, referred to herein as a S-P-P-R gear set.

An interconnecting member 170 continuously connects the carrier member 126, the carrier member 136, and the sun gear member 142. The interconnecting member 170 may alternatively be two separate components, one connecting the carrier members 126 and 136, and another connecting carrier member 136 with sun gear member 142.

The motor/generator 180 (also referred to as M/G A) is continuously connected with the sun gear member 122. The input member 116 is connected for common rotation with the ring gear member 124. Another motor/generator 182 (also referred to as M/G B) is connected for common rotation with the sun gear member 132. Ring gear member 144 is connected for common rotation with the output member 118. The motor/generators 180, 182 each have a rotor that is rotatable and a stator that is continuously grounded to a stationary member, such as a casing of the transmission 113. As is discussed further below, the transmission 113 is configured such that the motor/generators 180, 182 are subjected to a substantially equal maximum torque requirement that is required of each respective motor/generator at some point during four forward electrically-variable modes. This allows the motor/generators to have a substantially equal, minimal size. The motor/generators 180,182 may receive electrical power from or provide electrical power to an energy storage device 186 such as a battery. A hybrid control module (HCP) 188 is in signal communication with the battery 186 and with a power inverter 190 that is also in electrical communication with the stator portions of the motor/generators 180,182. The HCP 188 responds to a variety of input signals including vehicle speed, operator demand, the level at which the battery 186 is charged and the power being provided by the engine 12 to regulate the flow of power between the motor/generators 180,182 and the battery 186 via the inverter 190, which converts between direct current provided or utilized by the battery 186 and alternating current provided or utilized by the stator portions of the motor/generators 180,182. Discussed in greater detail below with reference to FIG. 3, the motor/generators 180,182 can be relaxed where no torque is provided between the engine and the motor/generators 180,182 to avoid undesirable high charging spikes to the battery 186 due to increases in engine speed and torque during engine cold starts. The HCP 188 has supervisory control over an engine control module (ECM) 123 configured to monitor inputs from sensors to determine states of engine parameters. The ECM 123 can further be configured to control actuators of the engine 12 to control combustion parameters including controlling intake mass airflow, spark-ignition timing, injected fuel mass, fuel injection timing, EGR valve position to control flow of recirculated exhaust gases, and intake and/or exhaust valve timing and phasing on engines so equipped. Hence, engine speed can be controlled without motor interaction based on controlling combustion parameters including airflow torque and spark induced torque.

Control module, module, control, controller, control unit, processor and similar terms mean any one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs or routines, combinational logic circuit(s), input/output circuit(s) and devices, appropriate signal conditioning and buffer circuitry, and other components to provide the described functionality. Software, firmware, programs, instructions, routines, code, algorithms and similar terms mean any controller executable instruction sets including calibrations and look-up tables. The control module has a set of control routines executed to provide the desired functions. Routines are executed, such as by a central processing unit, and are operable to monitor inputs from sensing devices and other networked control modules, and execute control and diagnostic routines to control operation of actuators. Routines may be executed at regular intervals, for example each 3.125, 6.25, 12.5, 25 and 100 milliseconds during ongoing engine and vehicle operation.

The electrically-variable transmission 113 also includes a plurality of torque-transmitting mechanisms C1 150, C2 152, C3 154 and C4 156. The electrically variable transmission 113 can also optionally include torque-transmitting mechanism C5 158. Torque-transmitting mechanism 150, a stationary clutch, also referred to as a brake, is selectively engagable to ground the carrier member 146 to a stationary member 184. Torque-transmitting mechanism 152, a rotating clutch, is selectively engagable to connect sun gear member 132 and motor/generator 182 for common rotation with carrier member 146. Torque-transmitting mechanism 154, a stationary clutch, is selectively engagable to ground the ring gear member 134 to the stationary member 184. Torque-transmitting mechanism 156, a rotating clutch, is selectively engagable to connect the motor/generator 180 and the ring gear member 134 for common rotation. Torque-transmitting mechanism 158, a stationary clutch, is selectively engagable to connect and ground the ring gear member 124 to the stationary member 184.

If the torque-transmitting mechanism 150 is engaged, carrier member 146 is a reaction member within the planetary gear set 140, and power transferred via the interconnecting member 170 will be transmitted through the sun gear member 142 to the ring gear member 144 and therefore to the output member 118. When the torque-transmitting mechanism 152 is engaged, the motor/generator 182 receives power from or delivers power to carrier member 146 as well as the sun gear member 132. When the torque-transmitting mechanism 154 is engaged, ring gear member 134 is held stationary and becomes a reaction member within the planetary gear set 130. When the torque-transmitting mechanism 156 is engaged, the motor/generator 180 is connected for rotation with the ring gear member 134, and either receives or accepts power through the ring gear member 134 as well as the sun gear member 122. When torque-transmitting transmitting mechanism 158 is engaged, ring gear member 124 is held stationary and becomes a reaction member within the planetary gear set 120, such that the speed of the input member 116 is locked-up.

The exemplary hybrid powertrain 110 is operative in several operating modes, including four forward electrically-variable modes, described with reference to Table 1, below.

TABLE 1

| Transmission | Applied Clutches | | | |
|---|---|---|---|---|
| Operating | C4 | C3 | C2 | C1 |
| Range state | 156 | 154 | 152 | 150 |
| Neutral 0 | | | | |
| Neutral 3 | | X | | |
| EVT Mode 1 | | X | | X |
| Fixed Gear Ratio 1 | X | X | | X |
| EVT Mode 2 | X | | | X |
| Fixed Gear Ratio 2 | X | | X | X |
| EVT Mode 3 | X | | X | |
| Fixed Gear Ratio 3 | X | X | X | |
| EVT Mode 4 | | X | X | |
| Neutral 34 | X | X | | |

The exemplary hybrid drive powertrain of FIG. 1 can utilize various combinations of engine 12 and motors 180 and 182 to provide torque to the powertrain 110. The exemplary hybrid powertrain 110 can be described as a four mode hybrid, wherein four electrically-variable gear modes or states (EVT Mode 1, EVT Mode 2, EVT Mode 3 and EVT Mode 4) are possible. That is, engagement of torque-transmitting mechanisms 150 and 154 establish a first forward electrically-variable mode (EVT Mode 1), engagement of torque-transmitting mechanisms 150 and 156 establish a second forward electrically-variable mode (EVT Mode 2), engagement of torque-transmitting mechanisms 152 and 156 establish a third forward electrically-variable mode (EVT Mode 3) and engagement of torque-transmitting mechanisms 152 and 154 establish a fourth forward electrically-variable mode (EVT Mode 4). Engagement of torque transmitting mechanism 158 in addition to each set of torque transmitting mechanisms that establish the electrically-variable modes discussed above, provides to lock-up the input shaft 116 and ground the engine 12. Therefore, when torque transmitting mechanisms 158 is additionally engaged in each of the electrically variable modes (EVT Modes 1-4), electrical vehicle (EV) modes are formed. The transmission also provides three fixed ratio modes of operation. A first fixed ratio mode is provided by engaging torque-transmitting mechanisms 150, 154 and 156, preferably at the mechanical point established between the first and second forward electrically-variable modes. A second fixed ratio mode is established by engaging torque-transmitting mechanisms 150, 152 and 156, preferably at the mechanical point established between the second and third electrically-variable modes. A third fixed ratio mode is established by engaging torque-transmitting mechanisms 152, 154 and 156.

Neutral operating modes are provided by engagement of the torque-transmitting mechanisms C3 154 and C4 156 (i.e., neutral 34) in one embodiment and engagement of the torque-transmitting mechanism C3 154 (i.e., neutral 3) alone in another embodiment. One of these neutral operating mode embodiments will be utilized when starting the engine, including during engine cold starts. When torque-transmitting mechanisms C3 154 and C4 156 are engaged, motor 182 may provide torque to the engine for initiating rotation of the crankshaft of the engine and controlling engine speed during engine firing while motor 180 is grounded. When only torque-transmitting mechanism C3 154 is engaged, both motors 180 and 182 may provide torque to the engine for initiating rotation of the crankshaft of the engine and controlling engine speed during engine firing.

Figure 2:
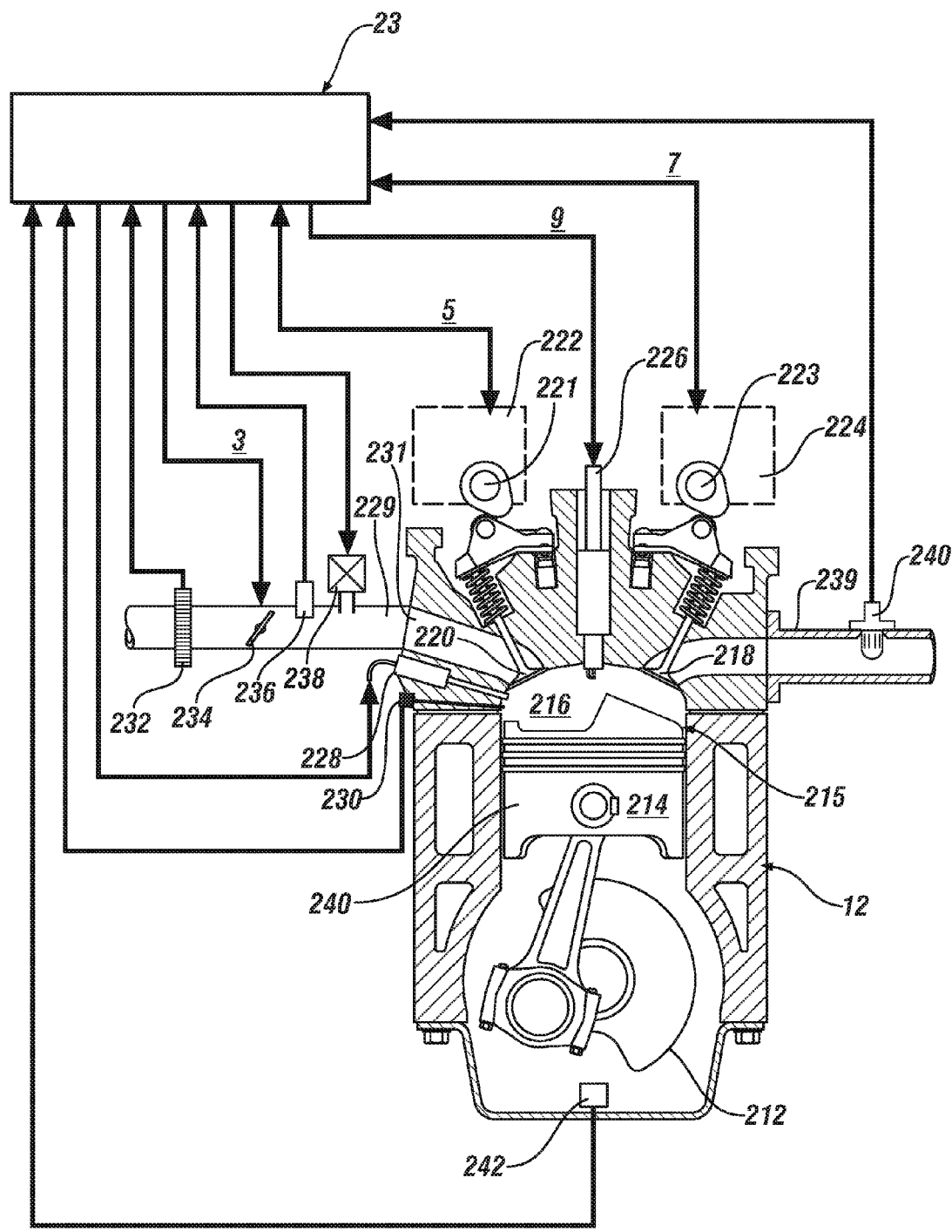
FIG. 2 illustrates an internal combustion engine and an accompanying engine control module, in accordance with the present disclosure.

In accordance with an exemplary embodiment of the present disclosure, FIG. 2 schematically shows the exemplary internal combustion engine 12 and an ECM 23 that have been constructed in accordance with an embodiment of the present disclosure. The disclosure is only exemplary and may be applied to various internal combustion engine systems and combustion cycles including conventional gasoline engines, compression ignition engines, diesel engines and engines selectively operative in a controlled auto-ignition (HCCI) combustion mode and a homogeneous spark-ignition (SI) combustion mode.

The exemplary engine 12 includes a multi-cylinder internal combustion engine having reciprocating pistons 214 slidably movable in cylinders 215 which define variable volume combustion chambers 216. Each piston 214 is connected to a rotating crankshaft 212 by which linear reciprocating motion is translated to rotational motion. An air intake system provides intake air to an intake manifold 229 which directs and distributes air into intake runners 231 of the combustion chambers 216. The air intake system includes airflow ductwork and devices for monitoring and controlling the airflow. The air intake devices preferably include a mass airflow sensor 232 for monitoring mass airflow and intake air temperature. A main throttle valve 234 preferably includes an electronically controlled butterfly valve that is used to controllably restrict airflow into the intake manifold 229 in response to a control signal 3 from the ECM 23. From the intake manifold 229, intake airflow is controllably restricted to individual cylinders by respective flow control devices located proximate to each individual cylinder. A pressure sensor 236 in the intake manifold 229 is configured to monitor manifold absolute pressure and barometric pressure. An external flow passage recirculates exhaust gases from engine exhaust to the intake manifold 229, having a flow control valve referred to as an exhaust gas recirculation (EGR) valve 238. The ECM 23 is operative to control mass flow of exhaust gas to the intake manifold 229 by controlling opening of the EGR valve 238.

Airflow from the intake manifold 229 into the combustion chamber 216 is controlled by one or more intake valve(s) 220. Exhaust flow out of the combustion chamber 216 is controlled by one or more exhaust valve(s) 218 to an exhaust manifold 239. The engine 12 is equipped with systems to control and adjust openings and closings of the intake and exhaust valves 220 and 218, respectively. In one embodiment, the openings and closings of the intake and exhaust valves 220 and 218 may be controlled and adjusted by controlling intake and exhaust variable cam phasing/variable lift control (VCP/VLC) devices 222 and 224, respectively. The intake and exhaust VCP/VLC devices 222 and 224 are configured to control and operate an intake camshaft 221 and an exhaust camshaft 223, respectively. The rotations of the intake and exhaust camshafts 221 and 223 are linked to and indexed to rotation of the crankshaft 212, thus linking openings and closings of the intake and exhaust valves 220 and 218 to positions of the crankshaft 212 and the pistons 214.

The intake VCP/VLC device 222 preferably includes a mechanism operative to switch and control valve lift of the intake valve(s) 220 and variably adjust and control phasing of the intake camshaft 221 for each cylinder 215 in response to a control signal 5 from the ECM 23. The exhaust VCP/VLC device 224 preferably includes a controllable mechanism operative to variably switch and control valve lift of the exhaust valve(s) 218 and variably adjust and control phasing of the exhaust camshaft 223 for each cylinder 215 in response to a control signal 7 from the ECM 23.

The intake and exhaust VCP/VLC devices 222 and 224 can each include a controllable two-step variable lift control (VLC) mechanism operative to control magnitude of valve lift, or opening, of the intake and exhaust valve(s) 220 and 218, respectively, to one of two discrete steps. The two discrete steps preferably include a low-lift valve open position (about 4-6 mm in one embodiment) preferably for load speed, low load operation, and a high-lift valve open position (about 8-13 mm in one embodiment) preferably for high speed and high load operation. The intake and exhaust VCP/VLC devices 222 and 224 each preferably includes a variable cam phasing (VCP) mechanism to control and adjust phasing (i.e., relative timing) of opening and closing of the intake valve(s) 220 and the exhaust valve(s) 218 respectively. Adjusting the phasing refers to shifting opening times of the intake and exhaust valve(s) 220 and 218 relative to positions of the crankshaft 212 and the piston 214 in the respective cylinder 215. The VCP mechanisms of the intake and exhaust VCP/VLC devices 222 and 224 each preferably has a range of phasing authority of about 60°-90° of crank rotation, thus permitting the ECM 23 to advance or retard opening and closing of one of intake and exhaust valve(s) 220 and 218 relative to position of the piston 214 for each cylinder 215. The range of phasing authority is defined and limited by the intake and exhaust VCP/VLC devices 222 and 224. The intake and exhaust VCP/VLC devices 222 and 224 include camshaft position sensors to determine rotational positions of the intake and the exhaust camshafts 221 and 223. The VCP/VLC devices 222 and 224 are actuated using one of electro-hydraulic, hydraulic, and electric control force, controlled by the ECM 23.

The engine 12 includes a fuel injection system, including a plurality of high-pressure fuel injectors 228 each configured to directly inject a mass of fuel into one of the combustion chambers 216 in response to a signal from the ECM 23. The fuel injectors 228 are supplied pressurized fuel from a fuel distribution system.

The engine 12 includes a spark-ignition system by which spark energy may be provided to a spark plug 226 for igniting or assisting in igniting cylinder charges in each of the combustion chambers 216 in response to a signal 9 from the ECM 23.

The engine 12 is equipped with various sensing devices for monitoring engine operation, including a crank sensor 242 having output RPM and operative to monitor crankshaft rotational position, i.e., crank angle and engine speed, wherein engine speed is effectively equal to the input speed $N_I$ of the input shaft 116. For simplicity, engine speed and rotational speed of the crankshaft 212 as measured by the crank sensor 242, will be referred to as $N_I$. In one embodiment, a combustion sensor 230 is configured to monitor combustion, and an exhaust gas sensor 240 is configured to monitor exhaust gases, typically an air/fuel ratio sensor. The combustion sensor 230 includes a sensor device operative to monitor a state of a combustion parameter and is depicted as a cylinder pressure sensor operative to monitor in-cylinder combustion pressure. The output of the combustion sensor 230 and the crank sensor 242 are monitored by the ECM 23 which determines combustion phasing, i.e., timing of combustion pressure relative to the crank angle of the crankshaft 212 for each cylinder 215 for each combustion cycle. The combustion sensor 30 may also be monitored by the ECM 23 to determine a mean-effective-pressure (IMEP) for each cylinder 215 for each combustion cycle. Preferably, the engine 12 and the ECM 23 are mechanized to monitor and determine states of IMEP for each of the engine cylinders 215 during each cylinder firing event. Alternatively, other sensing systems may be used to monitor states of other combustion parameters within the scope of the disclosure, e.g., ion-sense ignition systems, and non-intrusive cylinder pressure sensors.

In operation, the ECM 23 monitors inputs from the aforementioned sensors to determine states of engine parameters. The ECM 23 is configured to receive input signals from an operator (e.g., via a throttle pedal and a brake pedal) to determine an operator torque request. The ECM 23 monitors the sensors indicating the $N_I$ and intake air temperature, and coolant temperature and other ambient conditions.

The ECM 23 executes algorithmic code stored therein to control the aforementioned actuators to form the cylinder charge, including controlling combustion parameters that include intake mass airflow that can be utilized to control airflow torque, spark-ignition timing that can be utilized to control spark induced torque, injected fuel mass, fuel injection timing, EGR valve position to control flow of recirculated exhaust gases, and intake and/or exhaust valve timing and phasing on engines so equipped. Valve timing and phasing may include NVO and lift of exhaust valve reopening (in an exhaust re-breathing strategy) in one embodiment. The ECM 23 may operate to turn the engine 12 on and off during ongoing vehicle operation, and may operate to selectively deactivate a portion of the combustion chambers 216 or a portion of the intake and exhaust valves 220 and 218 through control of fuel and spark and valve deactivation. The ECM 23 may control an air/fuel ratio based upon feedback from the exhaust gas sensor 240.

As will become apparent, the ECM 123 (i.e., ECM 23) and the HCP 188 shown in FIG. 1 can be used in association with one another to reduce undesirable charging spikes to the battery 186 during engine cold starts.

Figure 3:
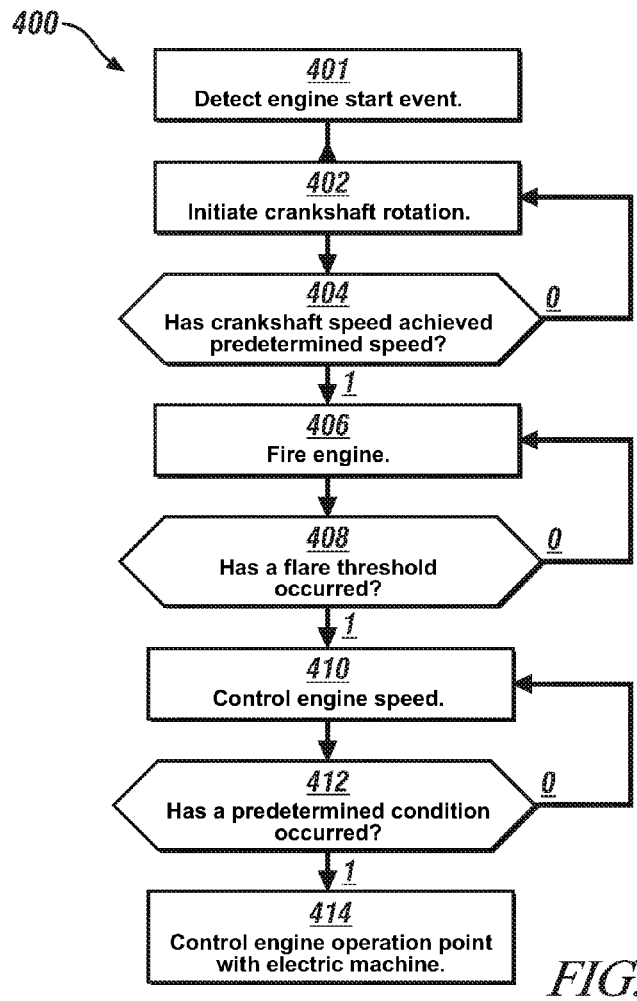
FIG. 3 illustrates a flowchart for an engine start event during cold start conditions utilizing four phases, in accordance with the present disclosure.

In an exemplary embodiment of the present disclosure, with reference to FIGS. 1 and 2, FIG. 3 illustrates an exemplary flowchart 400 for starting an internal combustion engine of a hybrid powertrain during cold start conditions. A cold start condition of the engine can be defined by an engine start event when a battery (e.g., energy storage device 186) power is within predetermined limits and the battery temperature is below a predetermined battery temperature. The engine start event can be in response to an operator engine start request or an engine autostart event. In an exemplary embodiment, the battery is a lithium ion battery, having a narrow operating range. In a non-limiting example, the operating range of the lithium ion battery is a 1.0 kilowatt discharge power limit and a −1.0 kilowatt charge limit. During engine cold start conditions, engine flares including torque and/or speed flares can occur due to high inaccuracy in an engine torque model once the engine enters speed control during engine firing. The engine flare can produce undesirable high charging spikes to the battery 186 when at least one electric machine (e.g., motor/generator 182 or motor/generators 180, 182) is providing torque for rotating the crankshaft of the engine (i.e., spinning the engine) and consequently absorbing the produced engine speed flares. To reduce the undesirable high charging spikes to the battery 186 that may exceed the operating range of the battery 186 during engine cold start conditions, embodiments of the present disclosure envision utilizing four phases for engine start events during cold start conditions. As will become apparent within the four phases, engine speed can be controlled based on controlling combustion parameters of the engine without any interaction from the at least one electric machine. When the at least one electric machine is not interacting with the engine 12, the at least one electric machine is freewheeling in a relaxed state providing zero torque output to the engine 12 and the battery 186.

Table 2 is provided as a key to FIG. 3 wherein the numerically labeled blocks and the corresponding functions are set forth as follows.

TABLE 2

| Block | Block Contents |
|---|---|
| 401 | Detecting an engine start event when battery power is within predetermined limits and the battery temperature is below a predetermined battery threshold. |
| 402 | Initiating rotation of a crankshaft of the engine with at least one electric machine. |
| 404 | Has the engine crankshaft speed achieved a predetermined engine crankshaft speed? |
| 406 | Firing the engine while controlling engine speed with the at least one electric machine. |
| 408 | Has a flare threshold occurred? |
| 410 | Controlling the engine speed based on controlling combustion parameters of the engine without any interaction from the at least one electric machine |
| 412 | Has a predetermined condition occurred? |
| 414 | Controlling the engine operation point with the electric machine while the engine continues firing |

Referring to block 401, when an engine start event is detected and when the battery power is within predetermined limits and the battery temperature is below a predetermined battery threshold, the flowchart proceeds to block 402. The engine start event can include an operator engine start request such as a key-on to the ignition. Further, the engine start event can include an engine start event during ongoing operation of the hybrid powertrain 113.

Referring to block 402, the first phase initiates rotation of the crankshaft of the engine with at least one electric machine until a predetermined crankshaft speed is achieved. In an exemplary embodiment, when torque-transmitting mechanisms 154 and 156 are engaged (i.e., neutral 34 mode), only motor/generator 182 is rotatably coupled to the engine, and therefore capable of initiating rotation of the crankshaft of the engine while motor/generator 180 is grounded. In another exemplary embodiment, when only torque-transmitting mechanism 154 is engaged (i.e., neutral 3 mode), each of the motor/generators 180 and 182 are rotatably coupled to the engine, and therefore both of the motor/generators 180 and 182 are capable of initiating rotation of the crankshaft of the engine. Engine fueling can occur simultaneously during the initiated rotation of the crankshaft. For purposes of discussing the exemplary flowchart 400, the exemplary embodiment where torque-transmitting mechanisms C3 154 and C4 156 are engaged (i.e., neutral 34) will be discussed herein. However, the methods disclosed in flowchart 400 are equally applicable to the alternative embodiment where only the torque-transmitting mechanism C3 154 is engaged. Therefore, the term "at least one electric machine" will be referring to only the motor/generator 182, however, the term "at least one electric machine" is equally applicable to include both the motor/generators 180, 182 in the alternative embodiment where only C3 154 (i.e., Neutral 3) is engaged.

Decision block 404 determines whether the engine crankshaft speed has achieved the predetermined engine crankshaft speed. The predetermined engine crankshaft speed can be selected as an optimal engine crankshaft speed required for engine firing. A "0" indicates that the engine crankshaft speed has not achieved the predetermined engine crankshaft speed, where the flowchart reverts back to block 402. A "1" indicates that the engine crankshaft speed has achieved the predetermined engine crankshaft speed and proceeds to block 406 where the engine is fired.

Referring to block 406, the second phase fires the engine while engine speed is controlled with the at least one electric machine until the occurrence of a flare threshold. The flare threshold will be discussed with reference to decision block 408. In an exemplary embodiment, controlling the engine speed correlates to the rotational speed of the crankshaft. The engine can be a conventional gasoline engine including spark-ignition where a spark ignites an air-fuel mixture thereby initiating the firing. The engine can be a compression-ignition engine, such as a Diesel engine, where heat of compression ignites an injected fuel mass thereby initiating the firing.

Decision block 408 determines whether the flare threshold has occurred. When a flare threshold has occurred, undesirable high charging spikes to the battery 186 can be produced when at least one electric machine is rotating the crankshaft of the engine due to high inaccuracy in an engine torque model once the engine enters speed control during engine firing. The flare threshold can occur when the crankshaft speed achieves a second predetermined crankshaft speed. The flare threshold can further occur when a predetermined number of cylinder events is achieved. The flare threshold can further occur when acceleration of the crankshaft achieves a predetermined crankshaft acceleration over a predetermined duration. A "0" indicates that the flare threshold has not occurred and reverts back to block 406 where engine firing is continued while controlling the engine speed with the at least one electric machine. A "1" indicates that the flare threshold has occurred where at least one of the second predetermined crankshaft is achieved, the predetermined number of cylinder events is achieved and the predetermined crankshaft acceleration over the predetermined duration is achieved. Therefore, when the flare threshold has occurred, the flowchart 400 proceeds to block 410.

Referring to block 410, phase 3 controls the engine speed based on controlling combustion parameters of the engine without any interaction from the at least one electric machine. Controlling combustion parameters can include controlling spark induced torque when the engine is a spark-ignition engine, such as a conventional gasoline engine. Controlling combustion parameters can further include controlling airflow torque. As such, the controlled combustion parameters are controlling engine speed without any interaction from the electric machine. In an exemplary embodiment, the ECM 123 (e.g., ECM 23) in phase 3 utilizes an engine torque model including an integrator value to control the combustion parameters to control the engine speed during said firing. However, high inaccuracy in the engine torque model can produce high charging spikes to the battery 186 once the flare threshold occurs because the at least one electric machine is absorbing torque from the engine flare. The high charging spikes can be eliminated or substantially reduced by allowing the at least one electric machine to be freewheeling in the relaxed state and thereby not absorbing any of the torque from the engine flare produced by the engine. Hence, the at least one electric machine is not interacting and the engine speed is controlled by controlling combustion parameters.

Further, block 410 encompassing the third phase can include controlling engine speed flare based on the controlled combustion parameters of the engine when a third predetermined crankshaft speed is achieved. Specifically, when the third predetermined crankshaft speed is achieved, the controlled combustion parameters can reduce engine speed flare based on controlling at least one of the spark induced torque of the engine and the airflow torque of the engine without any interaction from the at least one electric machine. The flowchart then proceeds to decision block 412.

Decision block 412 determines whether a predetermined condition has occurred. In an exemplary embodiment, the predetermined condition can occur when a transmission range selector (e.g., PRNDL lever) shifts to a drive state from a park transmission state or a neutral transmission state. For instance, in a non-limiting example a shift to a drive state from a neutral transmission state includes a shift from the neutral 34 state where torque-transmitting mechanisms C3 154 and C4 156 are engaged to the first forward electrically-variable mode (EVT Mode 1) where torque-transmitting mechanisms C1 150 and C3 154 are engaged. In another exemplary embodiment, the predetermined condition can occur when an engine coolant temperature achieves a predetermined engine coolant temperature and the battery temperature achieves a predetermined battery temperature. A "0" indicates that the predetermined condition has not occurred and the flowchart 400 reverts back to block 410 where control of the engine speed based on controlling combustion parameters of the engine without any interaction from the at least one electric machine is continued. A "1" indicates the predetermined condition has occurred and the flowchart proceeds to block 414. In other words, the occurrence of the predetermined condition indicates that high charging spikes outside the operating range of the battery are no longer a threat, and the engine speed can now be controlled with the at least one electric machine.

Referring to block 414, phase 4 includes controlling the engine speed with the at least one electric machine while the engine is still firing. In phase 4, the controlled engine speed with the at least one electric machine is initialized utilizing an integrator value corresponding to the integrator value associated with the controlled engine speed based on the controlled combustion parameters. For instance, the HCP 188 may utilize an integrator value to initialize the controlled engine speed with the at least one electric machine corresponding to an integrator value associated with the engine torque model in phase 3 to control the combustion parameters to control the engine speed during said firing. It will be understood that utilizing the integrator value to initialize the controlled engine speed with the at least one electric machine enables a smooth transition from controlling the engine speed based on the controlled combustion parameters (i.e., phase 3) to controlling the engine speed with the at least one electric machine while the engine is still firing (i.e., phase 4).

Figure 4:
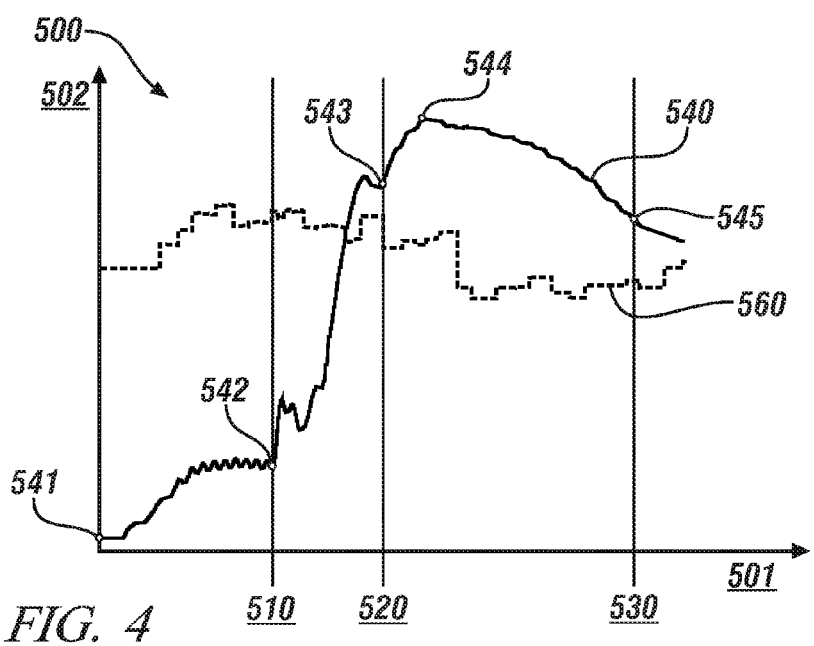
FIG. 4 illustrates experimental and derived data of an engine speed profile and a battery power profile during four phases for an engine start event during cold start conditions, in accordance with the present disclosure.

FIG. 4 illustrates experimental and derived data of a graph 500 including an engine speed profile 540 and a battery power profile 560 during four phases of an engine start event during cold start conditions in accordance with the present disclosure. Each of the four phases correspond to each of the four phases discussed above with reference to the exemplary flowchart 400. The horizontal axis 501 denotes time. The vertical axis 502 denotes battery power and engine speed. The first phase includes the area on the graph 500 between the vertical axis 502 and vertical line 510. The second phase includes the area between vertical lines 510 and 520. The third phase includes the area between vertical lines 520 and 530. The fourth phase includes the area beyond vertical line 530.

Referring to point 541 on the engine speed profile 540, an engine start event has been detected when the battery power is within predetermined limits and the battery temperature is below the predetermined battery threshold. In other words, an engine start event during cold start conditions has been detected.

Between points 541 and 542 on the engine speed profile 540, the first phase includes initiating rotation of a crankshaft of the engine with the at least one electric machine (e.g., motor/generator 182 or motor/generators 180 and 182). As aforementioned, the engine speed correlates to the rotational speed of the crankshaft. As illustrated on the engine speed profile 540, the engine speed increases before pulsating before point 542. The engine speed at point 542 corresponds to the predetermined crankshaft speed.

Between points 542 and 543 on the engine speed profile 540, the second phase includes firing the engine while controlling the engine speed with the at least one electric machine until a flare threshold occurs. Point 543 can correspond to the occurrence of the flare threshold. As aforementioned, the flare threshold can include an occurrence of one of achieving a second predetermined crankshaft speed, achieving a predetermined number cylinder events and achieving a predetermined crankshaft acceleration over a predetermined duration.

Between points 543 and 545 on the engine speed profile 540, the third phase includes controlling the engine speed based on controlling combustion parameters of the engine without any interaction from the at least one electric machine. In the third phase, the at least one electric machine (e.g., motor/generator 182 or motor/generators 180 and 182) is permitted to freewheel in the relaxed state, and hence no torque is on the at least one electric machine. Therefore, any charging spikes upon the battery that occur from engine speed flare are avoided. Specifically, the engine speed is controlled by controlling at least one of spark induced torque and airflow torque. Point 544 corresponds to the third predetermined crankshaft speed, where engine flare is controlled based on the controlling combustion parameters without any interaction from the at least one electric machine. Specifically, when the engine speed profile 540 achieves point 544 (e.g., the third predetermined crankshaft speed), engine flare is reduced based on the controlling combustion parameters without any interaction from the at least one electric machine. The reduction in engine flare is illustrated between points 544 and 545 on the engine speed profile 540.

Point 545 on the engine speed profile 540 corresponds to the occurrence of the predetermined condition. As aforementioned, the predetermined condition can include a transmission range selector shift to a drive state from one of a park transmission state and a neutral transmission state. Likewise, the predetermined condition can include the engine coolant temperature achieving the predetermined engine coolant temperature and the battery temperature achieving the predetermined battery temperature. Therefore, it has been detected charging spikes to the battery are no longer a threat, and the engine speed can be controlled with the at least one electric machine.

In the fourth phase, the engine speed is controlled with the at least one electric machine while the engine is still firing beyond point 545 on the engine speed profile 540. As aforementioned, controlling the engine speed with the at least one electric machine includes initializing the controlled engine speed with the at least one electric machine utilizing an integrator value corresponding to an integrator value associated with the controlled engine speed based on the controlled combustion parameters in the third phase.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. Method to start operation of an internal combustion engine of a hybrid powertrain, the hybrid powertrain comprising the engine, an energy storage device, an electro-mechanical transmission including at least one electric machine rotatably coupled to the engine, the electro-mechanical transmission selectively controllably operative to transmit torque among the engine and the at least one electric machine, comprising:

initiating rotation of a crankshaft of the engine with the at least one electric machine until a first predetermined crankshaft speed is achieved; and in response to the first predetermined crankshaft speed being achieved, firing the engine, and during the firing of the engine controlling engine speed with the at least one electric machine until a flare threshold occurs, increasing the engine speed based solely on controlling combustion parameters of the engine until a second predetermined crankshaft speed is achieved while operating the at least one electric machine in a relaxed state providing zero torque output to the engine and the energy storage device, reducing the engine speed once the second predetermined crankshaft speed is achieved based solely on controlling combustion parameters of the engine while operating the at least one electric machine in the relaxed state providing zero torque output to the engine and the energy storage device, and when a predetermined condition occurs, controlling the engine speed with the at least one electric machine while the engine is still firing.

2. The method of claim 1 wherein the at least one electric machine comprises a first electric machine and a second electric machine, each of the first and second electric machines rotatably coupled to the engine.

3. The method of claim 1 wherein firing the engine while controlling the engine speed with the at least one electric machine until the flare threshold occurs comprises firing the engine while controlling the engine speed with the electric machine until the crankshaft speed achieves a third predetermined crankshaft speed.

4. The method of claim 1 wherein firing the engine while controlling the engine speed with the at least one electric machine until the flare threshold occurs comprises firing the engine while controlling the engine speed with the electric machine until a predetermined number of cylinder events is achieved.

5. The method of claim 1 wherein firing the engine while controlling the engine speed with the at least one electric machine until the flare threshold occurs comprises firing the engine while controlling the engine speed with the electric machine until acceleration of the crankshaft achieves a predetermined crankshaft acceleration over a predetermined duration.

6. The method of claim 1 wherein reducing the engine speed once the second predetermined crankshaft speed is achieved comprises reducing engine flare based on controlling at least one of spark induced torque of the engine and airflow torque of the engine.

7. The method of claim 1 wherein said predetermined condition comprises a transmission range selector shifting to a drive state from one of a park state and a neutral state.

8. The method of claim 1 wherein said predetermined condition comprises an engine coolant temperature achieving a predetermined engine coolant temperature and a battery temperature achieving a predetermined battery temperature.

9. The method of claim 1 wherein, in response to the occurrence of the predetermined condition, controlling the engine speed with the at least one electric machine when the engine is still firing comprises initializing said controlled engine speed with the at least one electric machine utilizing an integrator value associated with the controlled engine speed based on the controlled combustion parameters.

10. Method to start operation of an internal combustion engine of a hybrid powertrain, the hybrid powertrain comprising the engine, a battery, an electro-mechanical transmission including at least one electric machine rotatably coupled to the engine, the electro-mechanical transmission selectively controllably operative to transmit torque among the engine and the at least one electric machine, comprising:

initiating rotation of a crankshaft of the engine with the at least one electric machine until a first predetermined crankshaft speed is achieved;
 firing the engine while controlling engine speed with the at least one electric machine until an occurrence of one of,
  a second predetermined crankshaft speed is achieved,
  a predetermined number of cylinder events is achieved, and
  a predetermined crankshaft acceleration over a predetermined duration is achieved; and
 during the firing of the engine
  increasing the engine speed based solely on controlling at least one of a spark induced torque of the engine and an airflow torque of the engine until a third predetermined crankshaft speed is achieved while operating the at least one electric machine in a relaxed state providing zero torque output to the engine and the energy storage device,
  reducing the engine speed once the third predetermined crankshaft speed is achieved based solely on controlling combustion parameters of the engine while operating the at least one electric machine in the relaxed state providing zero torque output to the engine and the energy storage device, and
  controlling the engine speed with the at least one electric machine while the engine is still firing subsequent to an occurrence of at least one of,
   a transmission range selector shifting to a drive state from one of a park state and a neutral state, and
   an engine coolant temperature achieving a predetermined engine coolant temperature and a battery temperature achieving a predetermined battery temperature.

11. The method of claim 10 wherein the at least one electric machine comprises a first electric machine and a second electric machine, each of the first and second electric machines rotatably coupled to the engine.

12. The method of claim 10 further comprising:
 immediately preceding said initiating rotation of the crankshaft of the engine with the at least one electric machine, detecting an engine start event when the battery power is within predetermined limits and the battery temperature is below the predetermined battery threshold.

13. The method of claim 10 wherein said battery comprises a lithium ion battery.

14. The method of claim 10 further comprising:
 simultaneously fueling the engine during said initiating rotation of the crankshaft of the engine with the at least one electric machine.

* * * * *